United States Patent
Zhao et al.

(10) Patent No.: US 10,536,210 B2
(45) Date of Patent: Jan. 14, 2020

(54) INTERFERENCE SUPPRESSING METHOD AND DEVICE IN DYNAMIC FREQUENCY SPECTRUM ACCESS SYSTEM

(71) Applicant: SONY CORPORATION, Tokyo (JP)

(72) Inventors: Youping Zhao, Beijing (CN); Yiteng Wang, Beijing (CN); Xin Guo, Beijing (CN); Chen Sun, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/571,865

(22) PCT Filed: Apr. 14, 2016

(86) PCT No.: PCT/CN2016/079275
§ 371 (c)(1),
(2) Date: Nov. 6, 2017

(87) PCT Pub. No.: WO2016/180150
PCT Pub. Date: Nov. 17, 2016

(65) Prior Publication Data
US 2018/0145741 A1    May 24, 2018

(30) Foreign Application Priority Data
May 13, 2015    (CN) .......................... 2015 1 0242551

(51) Int. Cl.
*H04B 7/08*    (2006.01)
*H04B 17/354*    (2015.01)
(Continued)

(52) U.S. Cl.
CPC ......... *H04B 7/0857* (2013.01); *H04B 17/354* (2015.01); *H04W 16/10* (2013.01);
(Continued)

(58) Field of Classification Search
CPC ............ H04L 27/0006; H04W 52/243; H04W 52/244; H04W 52/38; H04W 16/10;
(Continued)

(56) References Cited

U.S. PATENT DOCUMENTS

| 8,233,939 B2 | 7/2012 | Li et al. |
| 8,812,011 B2* | 8/2014 | Hassan ................... H04W 4/00 455/454 |

(Continued)

FOREIGN PATENT DOCUMENTS

| CN | 102812646 A | 12/2012 |
| CN | 103442366 A | 12/2013 |

(Continued)

OTHER PUBLICATIONS

Xin Xia et al: 11SINR or SLNR: In Successive User Scheduling in MU-MIMO Broadcast Channel with Finite Rate Feedback 11, Communications and Mobile Computing (CMC), 2010 International Conference on, IEEE, Piscataway, NJ, USA, Apr. 12, 2010 (Apr. 12, 2010), pp. 383-387, XP031680329, ISBN: 978-1-4244-6327-5.

(Continued)

*Primary Examiner* — Sophia Vlahos
(74) *Attorney, Agent, or Firm* — Xsensus LLP (57) ABSTRACT

An interference suppressing method and device in a dynamic frequency spectrum access (DSA) system. The system includes: a frequency spectrum management device, a primary system including a plurality of primary devices, and a secondary system including a plurality of secondary devices. The method includes: transmitting position information of each of the secondary devices to the frequency spectrum management device; determining, by the frequency spectrum management device, a weight factor for a specific secondary device according to the received position (Continued)

formation; and performing a second-stage precoding, and in the second-stage precoding, adjusting, by using the weight factor, an estimated power of the specific secondary device leaking to the other secondary device.

17 Claims, 7 Drawing Sheets

(51) Int. Cl.
  *H04W 16/10* (2009.01)
  *H04W 72/10* (2009.01)
  *H04W 72/08* (2009.01)
  *H04W 16/14* (2009.01)

(52) U.S. Cl.
  CPC ......... *H04W 72/082* (2013.01); *H04W 72/10* (2013.01); *H04W 16/14* (2013.01)

(58) Field of Classification Search
  CPC ... H04W 72/082; H04W 72/10; H04W 16/14; H04B 7/0857; H04B 17/354
  See application file for complete search history.

(56) References Cited

U.S. PATENT DOCUMENTS

2010/0061294 A1* 3/2010 Proctor, Jr. ........... H04W 4/029
                                                      370/328
2013/0022021 A1   1/2013 Wild et al.
2015/0092700 A1   4/2015 Li et al.
2015/0119014 A1*  4/2015 Muraoka ............... H04W 16/14
                                                      455/418
2015/0124765 A1*  5/2015 Rong ................... H04B 7/0465
                                                      370/329
2016/0119882 A1   4/2016 Liu et al.

FOREIGN PATENT DOCUMENTS

| CN | 103780356 A    | 5/2014  |
| CN | 104144482 A    | 11/2014 |
| WO | 2014/180260 A1 | 11/2014 |

OTHER PUBLICATIONS

Chen Sun (Sony): "Coexistence Management Considering Precoding and Priority; 19-15-0093-00-001a-coexistence-management-considering-pre-coding-and-priority", IEEE Draft; 19-15-0093-00-001A-Coexistence-Management-Considering-Pre-Coding-And-Priority, IEEE-SA Mentor, Piscataway, NJ USA,VO I . 802 .19 .1,Nov. 9, 2015 (Nov. 9, 2015), pp. 1-11, XP068099767.
Supplemental European Search Report dated Oct. 16, 2018, issued in corresponding European Application No. 16792000.
International Search Report dated Jul. 5, 2016 in PCT/CN2016/079275 filed Apr. 14, 2016.

* cited by examiner

INTERFERENCE SUPPRESSING METHOD AND DEVICE IN DYNAMIC FREQUENCY SPECTRUM ACCESS SYSTEM

TECHNICAL FIELD

The present disclosure relates to interference suppressing method and device in a dynamic frequency spectrum access system, and in particular to interference suppressing method and device in a dynamic frequency spectrum access system which is capable of distinguishing priorities of secondary devices.

BACKGROUND

With the rapid development of information technology and multi-service wireless network, there is an increasing demand for broadband wireless services. Frequency spectrum, as a precious non-renewable resource, is gradually becoming short. However, the conventional fixed frequency spectrum allocation strategy results in that a lot of frequency spectrum allocated to authorized users are not be used in certain time periods. Therefore, the spectrum utilization ratio is low, and a large amount of frequency spectrum is wasted. With the emergence of cognitive radio (CR) technology, the spectrum utilization ratio is improved, and the problem caused by insufficient spectrum resource is mitigated. Therefore, the cognitive radio technology becomes a research hotspot in the field of wireless communication.

A device (referred to as "a secondary device" herein) using the cognitive radio technology may opportunistically access to a legal frequency band of an authorized user equipment (referred to as "a primary device" herein) without affecting normal communication of the authorized user equipment. As such, dynamic spectrum access (DSA) is implemented, and the spectrum utilization ratio is improved.

The introduction of the cognitive radio technology can ameliorate the problem of insufficient spectrum resource. However, since different modulated signals are transmitted on the same frequency band, a primary device which operates on the same frequency band as a secondary device may be interfered by the signal transmitted from the secondary device. Therefore, an advanced algorithm is required to control the operating frequency and the transmission power of the secondary device, to ensure the communication quality of the primary device. In addition, the secondary devices operating on the same frequency band may interfere with each other. Thus the interference between the secondary devices should also be taken into consideration.

For a DSA system in which the secondary devices have different priorities (or QoS levels), it is required to design an interference suppressing method which may take the priorities of the secondary devices into consideration and guarantee different QoS for the secondary devices having different priorities, while the priorities of the secondary devices are not taken into consideration in currently existing interference suppressing methods.

SUMMARY

To solve the above problems, new interference suppressing method and device applicable to the DSA system are provided in the present disclosure.

In an aspect of the present disclosure, a spectrum management device is provided, which includes one or more processors configured to: determine position information of each secondary device in a secondary system comprising multiple secondary devices; and determine a weighting factor for a specific secondary device based on the position information, wherein the weighting factor is used to adjust estimation of power leaked from the specific secondary device to other secondary devices.

In another aspect of the present disclosure, a secondary device in a secondary system is provided. The secondary device includes one or more processors configured to: determine position information of the secondary device, so that a spectrum management device determines a weighting factor for the secondary device based on the position information.

In another aspect of the present disclosure, a method for suppressing interference in a communication system is provided. The communication system includes a spectrum management device, a primary system including multiple primary devices, and a secondary system including multiple secondary devices. The method includes: transmitting position information of each of the secondary devices to the spectrum management device; determining, by the spectrum management device, a weighting factor for a specific secondary device based on the received position information; and performing second-stage precoding, in which the weighting factor is used to adjust estimation of power leaked from the specific secondary device to other secondary devices.

According to the technology of the present disclosure, transmission precoding is performed on the secondary device in consideration of the priority of the secondary device, thereby guaranteeing different qualities of service (QoS) for the secondary devices having different priorities. In addition, on the premise of ensuring that interference from the secondary device to a primary device is lower than a certain threshold, a limitation on the maximum transmission power for the secondary device is relaxed with the technology according to the present disclosure, compared with the conventional power control method. The present disclosure is applicable to a DSA system in which priorities of secondary devices are distinguished, thereby achieving a goal of joint optimization for QoS of the primary device and the secondary device.

BRIEF DESCRIPTION OF THE DRAWINGS

The present disclosure may be better understood with reference to the description given hereinafter in conjunction with the drawings, in which same or similar reference numerals are used to represent the same or similar components throughout the drawings. The drawings together with the following detailed description are included in this specification and form a part of this specification, and are intended to further illustrate the preferred embodiments of the present disclosure and to explain the principles and advantages of the present disclosure. In the drawings.

DETAILED DESCRIPTION OF THE EMBODIMENTS

Figure 1:
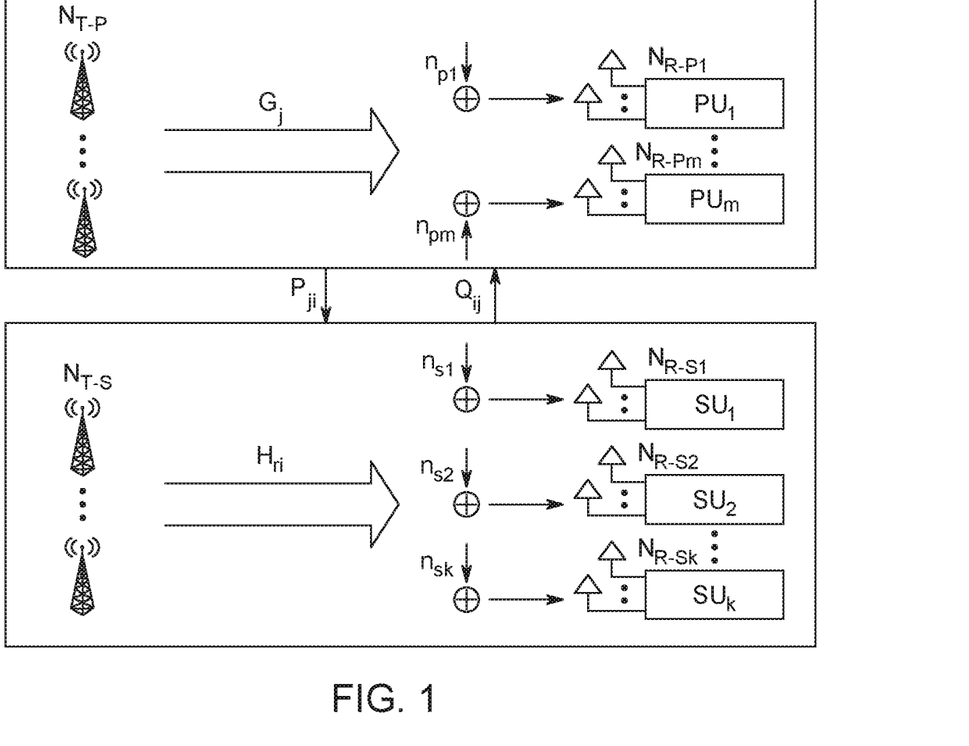
FIG. 1 is a schematic diagram showing architecture of a DSA system.

FIG. 1 is a schematic diagram showing architecture of a multi-antenna DSA system. An upper dashed box in FIG. 1 represents a primary system. The primary system includes multiple primary base stations $N_{T\text{-}P}$, and multiple primary devices $PU_1$ to $PU_m$ communicating in legally-allocated frequency bands. Each primary device adopts multi-antenna configuration, $G_j$ represents a channel matrix of the primary system, and $n_{p1}$ to $n_{pm}$ represent additive white gaussian noise on communication channels of the multiple primary devices, respectively.

A lower dashed box in FIG. 1 represents a secondary system. The secondary system includes multiple secondary base stations $N_{T\text{-}S}$, and multiple secondary devices $SU_1$ to $SU_k$ using cognitive radio technology. As described above, on the premise of ensuring communication quality of the primary device, one or more of the secondary devices $SU_1$ to $SU_k$ may opportunistically access to the legal frequency band of the primary device, thereby achieving dynamic spectrum access and improving the spectrum utilization ratio. Each of the secondary devices has multi-antenna configuration, $H_{ri}$ represents a channel matrix of the secondary system, and $n_{s1}$ to $n_{sk}$ represent additive white gaussian noise on communication channels of the multiple secondary devices, respectively.

$P_{ij}$ between the upper dashed box and the lower dashed box represents a channel matrix between a j-th primary device as a transmitting terminal and an i-th secondary device as a receiving terminal, and is used for characterizing interference from the primary device to the secondary device. $Q_{ij}$ represents a channel matrix between an i-th secondary device as a transmitting terminal and a j-th primary device as a receiving terminal, and is used for characterizing interference from the secondary device to the primary device.

As described above, different secondary devices have different priorities, that is, different QoS levels. An interference leakage weighting factor is proposed under consideration of the priorities of the secondary devices in the present disclosure. The interference leakage weighting factor is used to weight a power (that is, interference) which is leaked from a specific secondary device to other secondary device, thereby guaranteeing different QoS based on different priorities of the secondary devices.

Specifically, for the secondary device having a higher priority, a smaller value of an interference leakage weighting factor is set, on the contrary, for the second device having a lower priority, a larger value of an interference leakage weighting factor is set. In this way, a value obtained by multiplying a smaller value of the interference leakage weighting factor by a power leaked from a specific secondary device to other secondary device is smaller, which indicates that the power leaked from the specific secondary device to other secondary device may be estimated to be lower, that is, an interference from the specific secondary device to other secondary devices may be estimated to be low. Hence, interference from the secondary device having the higher priority to other secondary devices may be estimated to be lower. Accordingly, when performing transmission precoding, interference from the secondary device having the higher priority to other secondary devices may be considered to be less than the interference from a secondary device having a lower priority on other secondary device, thereby providing better QoS guarantee to the secondary device having the higher priority than the secondary device having the lower priority.

Figure 2:
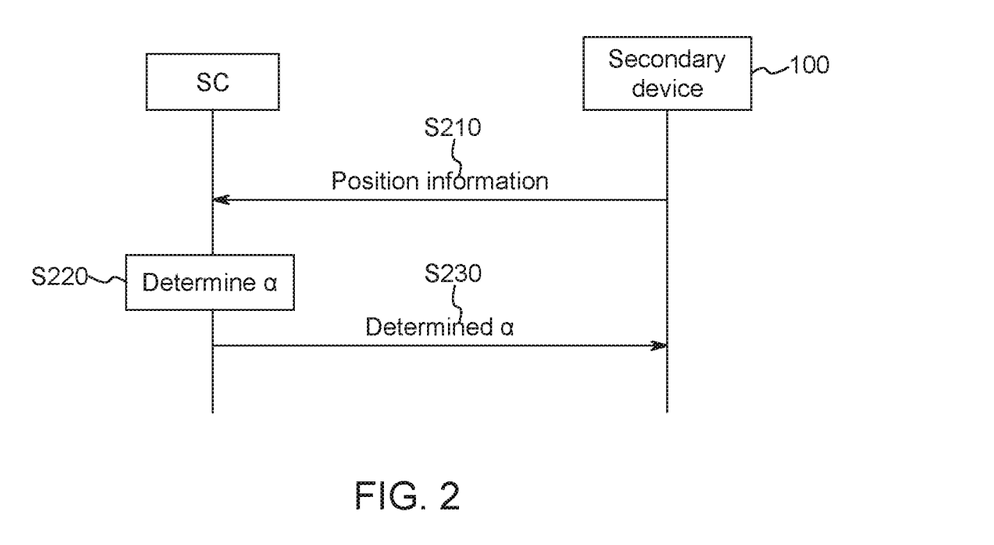
FIG. 2 is a schematic flowchart for determining an interference leakage weighting factor.

FIG. 2 is a schematic flow for determining an interference leakage weighting factor. As shown in FIG. 2, a secondary device 100 reports position information thereof to a spectrum coordinator (SC) in step S210. Optionally, the secondary device 100 may report a priority thereof to the SC in a case where the SC does not know the priority of the secondary device 100. Then, the SC determines an interference leakage weighting factor $\alpha$ for the secondary device 100 based on the received information in step S220, a value of $\alpha$ is set dynamically based on the number of priorities of all active (operative) secondary devices on the same frequency band as the secondary device 100 within a predetermined range of the secondary device 100 and the number and a distribution density of the secondary devices having the same priority as the secondary device 100, in this way, a system resource can be avoided from being wasted effectively. Step S220 will be described in detail hereinafter. Then, the SC transmits the determined $\alpha$ to the secondary device 100 in step S230.

Additionally and optionally, the secondary device 100 may also report payment information of a user to the SC in step S210. The SC may determine a small interference leakage weighting factor $\alpha$ for the secondary device 100 in a case where the user pays a fee.

Step S220 performed by the SC will be described in detail as follows.

When determining the interference leakage weighting factor $\alpha$ for the secondary device 100, the SC firstly determines an influence range (that is, a range, a device in which may suffer from interference of the secondary device 100) of the secondary device 100 for example based on information such as the positional information, an operating frequency and a transmission power of the secondary device 100, and then determines the number of priorities of all active secondary devices on the same frequency band as the secondary device 100 within the influence range. It should be noted that, for example, an operating frequency of the secondary device may be known by the SC in advance, and the transmission power of the secondary device may be determined by the SC. For example, it is assumed that the secondary system includes secondary devices having four priorities (priority 1 to priority 4), and there are only active secondary devices on the same frequency band as the secondary device 100 which have three priorities within the influence range of the secondary device 100 (assumed that there is no secondary device having the priority 2). In this case, it can determine that the number of priorities of all active secondary devices on the same frequency band as the secondary device 100 within the influence range of the secondary device 100 is 3. Then, the priorities of all active secondary devices on the same frequency band as the secondary device 100 within the influence range are re-classified into new priority 1 to new priority 3. For example, since there is no secondary device having the original priority 2, the secondary device having the original priority 3 can be classified as the new priority 2, and so on. Then, three values of α are evenly set within a range from 0 to 1, inclusively, for example, 0, 0.5 and 1, and the three values correspond to new three priorities respectively. In the example, assumed that the original priority of the secondary device 100 is 3, the priority of the secondary device 100 is changed to be 2 after re-classification, a value of an interference leakage weighting factor α for the secondary device 100 is preliminarily determined to be 0.5.

After the above preliminary determination, a value "0.5" of α is adjusted based on the number and a distribution density of active secondary devices on the same frequency band as the secondary device 100 which have the same priority (priority 2) as the secondary device 100, to determine a final interference leakage weighting factor α. Specifically, in a case where there is a large number of the active secondary devices on the same frequency band as the secondary device 100 or the active secondary devices on the same frequency band as the secondary device 100 are distributed densely, in order to suppress mutual interference between the secondary devices having the same priority and guarantee QoS of each of the secondary devices, interference from each of the secondary devices is considered to be larger, hence, the value "0.5" of α preliminarily determined is increased.

Those skilled in the art readily design various adjustment schemes according to design requirements or practical applications. For example, the numbers of the secondary devices having the same priority may be classified into multiple ranges, a corresponding adjustment amount is set for each range, and the adjustment amount is not limited to increment but may also be decrement. The preliminarily determined value of α may be adjusted based on a preset adjustment amount in a case where the number of the active secondary devices having the same priority as the secondary device 100 falls within a certain range.

Figure 3:
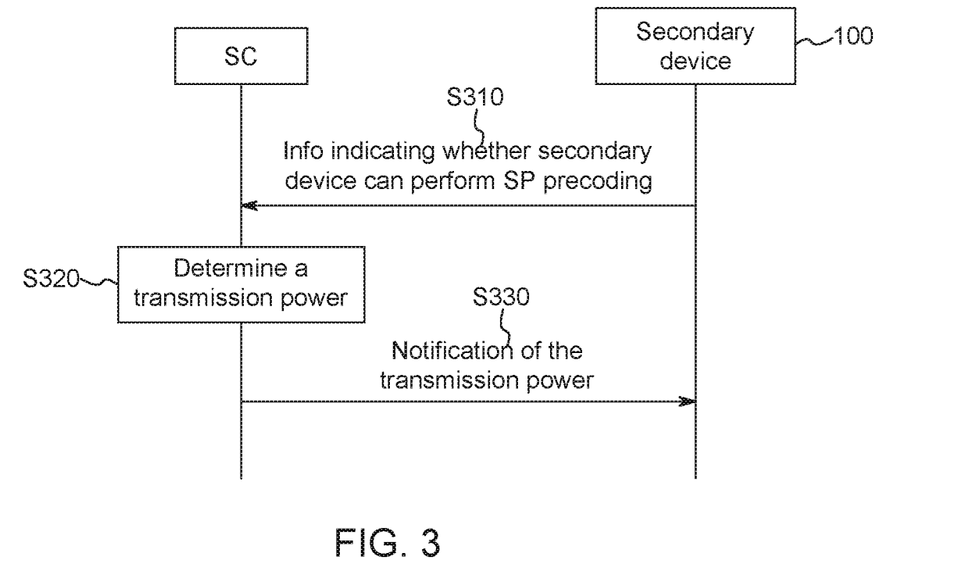
FIG. 3 is a schematic flowchart for determining a transmission power of a secondary device.

FIG. 3 is a schematic flow for determining a transmission power of the secondary device 100. As shown in FIG. 3, the secondary device 100 reports information indicating whether the secondary device 100 can perform subspace mapping (SP) precoding to the spectrum coordinator SC in step S310. SP precoding may project the transmitted signal of the secondary device into a zero space of an interference channel from the secondary device to a primary device according to a matrix subspace projection theory, thereby effectively suppressing interference to the primary device which is caused by the secondary device occupying the spectrum of the primary device.

Then, the SC determines a transmission power of the secondary device 100 based on the received information in step S320. Specifically, the SC determines a transmission power of the secondary device 100 with a conventional power control method in a case where the information indicates that the secondary device 100 cannot perform SP precoding. Interference from the secondary device 100 to the primary device can be suppressed to a certain extent in a case where the information indicates that the secondary device 100 can perform SP precoding. In this case, the limitation on the transmission power of the secondary device 100 may be appropriately relaxed. Hence, the SC may appropriately increase the transmission power of the secondary device 100 (compared with conventional power control), preferably, the transmission power of the secondary device 100 may be increased by 26 dB in maximum. Then the SC notifies the secondary device 100 of the determined transmission power in step S330.

Figure 4A:
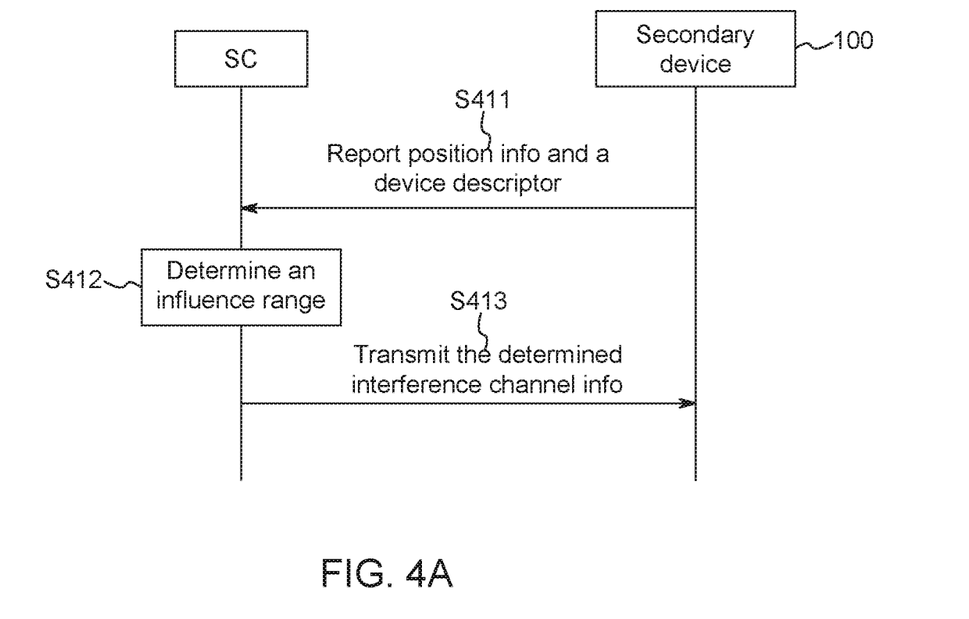
FIG. 4A is a schematic flowchart of a first example for determining interference channel information from a secondary device to a primary device.
Figure 4B:
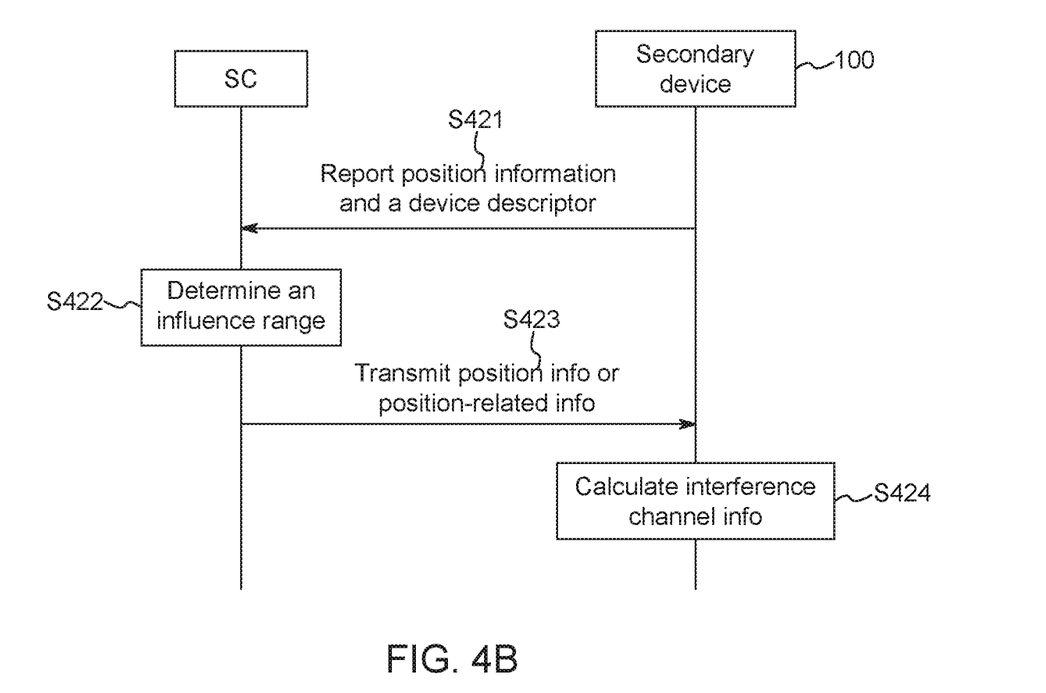
FIG. 4B is a schematic flowchart of a second example for determining interference channel information from a secondary device to a primary device.
Figure 4C:
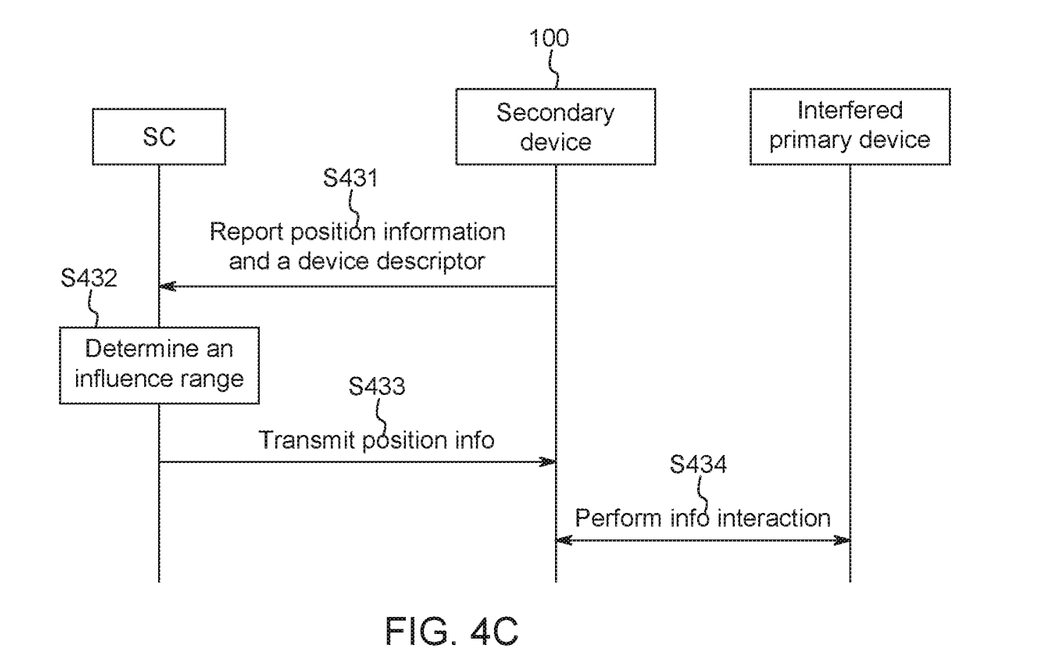
FIG. 4C is a schematic flowchart of a third example for determining interference channel information from a secondary device to a primary device.

FIGS. 4A to 4C show flowcharts of three examples for determining interference channel information from the secondary device to the primary device.

As shown in FIG. 4A, the secondary device 100 reports the position information and a device descriptor thereof to the SC in step S411. The SC may obtain physical configuration for example a maximum transmission power of the secondary device 100, based on the device descriptor.

Then, in step S412, the SC determines an influence range of the secondary device 100 (that is, a range, a device in which suffer from interference from the secondary device 100) based on information such as the position, an operating frequency and the transmission power of the secondary device 100, and then detects positions and operating frequencies of one or more primary devices within the influence range, to determine the primary device (referred to as "interfered primary device" hereinafter) which is most susceptible to interference from the secondary device 100, and the SC determines interference channel information from the secondary device 100 to the interfered primary device using an advanced geolocation engine (AGE) database.

The SC transmits the determined interference channel information from the secondary device 100 to the interfered primary device to the secondary device 100 in step S413.

FIG. 4B shows another example for determining interference channel information from the secondary device to the primary device. In the example, assumed that a spectrum coordinator SC knows device capability information on each of the primary devices in the primary system. For example, the primary device may actively report the device capability information, or the SC may query the primary device about the device capability information.

The device capability information may include, for example:

antenna array type, such as a linear array, a planar array and a circular array;

antenna boresight azimuth angle representing an angle from north end of the longitudinal axis to an antenna in clockwise direction, and a value thereof is a real number; and antenna boresight elevation angle representing an elevation angle of an antenna from a direction parallel to the ground to a direction perpendicular to the sky, and a value thereof is a real number.

As shown in FIG. 4B, the secondary device 100 reports the position information and a device descriptor thereof to the SC in step S421. As described above, the device descriptor may include information on the maximum transmission power of the secondary device 100.

Then, in step S422, the SC determines an influence range of the secondary device 100 based on information such as position, operating frequency and transmission power of the secondary device 100, and detects position and operating frequency of one or more primary devices within the influence range, so as to determine the interfered primary device which is most susceptible to interference from the secondary device 100.

The SC transmits position information or other parameter information (referred to as "position-related information" hereinafter) for characterizing a relative position and the device capability information of the interfered primary device to the secondary device 100 in step S423. It should be noted that, the SC may use position information of a reference point as the position information of the interfered primary device in a case where the SC does not know the position information of the interfered primary device. The reference point is a position point in a coverage area of the primary system which is closest to the secondary device 100.

The secondary device 100 calculates interference channel information from the secondary device 100 to the interfered primary device based on the received position information and the device capability information of the interfered primary device in step S424.

FIG. 4C shows another example for determining interference channel information between the secondary device and the primary device.

As shown in FIG. 4C, the secondary device 100 reports the position information and a device descriptor thereof to a SC in step S431. As described above, the SC may obtain a maximum transmission power of the secondary device 100 based on the device descriptor.

In step S432, the SC determines an influence range of the secondary device 100 based on, for example, the position, an operating frequency and the transmission power of the secondary device 100, and detects positions and operating frequencies of one or more primary devices within the influence range, so as to determine the interfered primary device which is most susceptible to interference from the secondary device 100. The SC transmits the determined position information of the interfered primary device to the secondary device 100 in step S433.

In step S434, the secondary device 100 performs information interaction and actual channel measurement with the interfered primary device based on the received position information of the interfered primary device, to obtain interference channel information between the secondary device 100 and the interfered primary device. For example, in order to perform channel measurement, the secondary device 100 and the interfered primary device should exchange device capability information with each other. The device capability information may be exchanged under control of the SC, or may be exchanged by the secondary device 100 and the interfered primary device via a wired or wireless link.

Figure 5A:
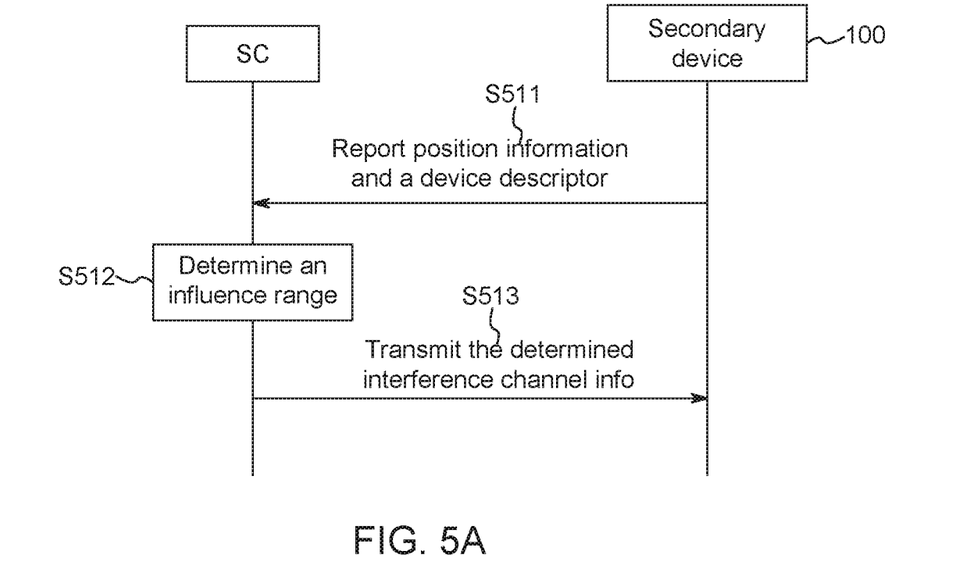
FIG. 5A is a schematic flowchart of a first example for determining interference channel information from a specific secondary device to other secondary device.
Figure 5B:
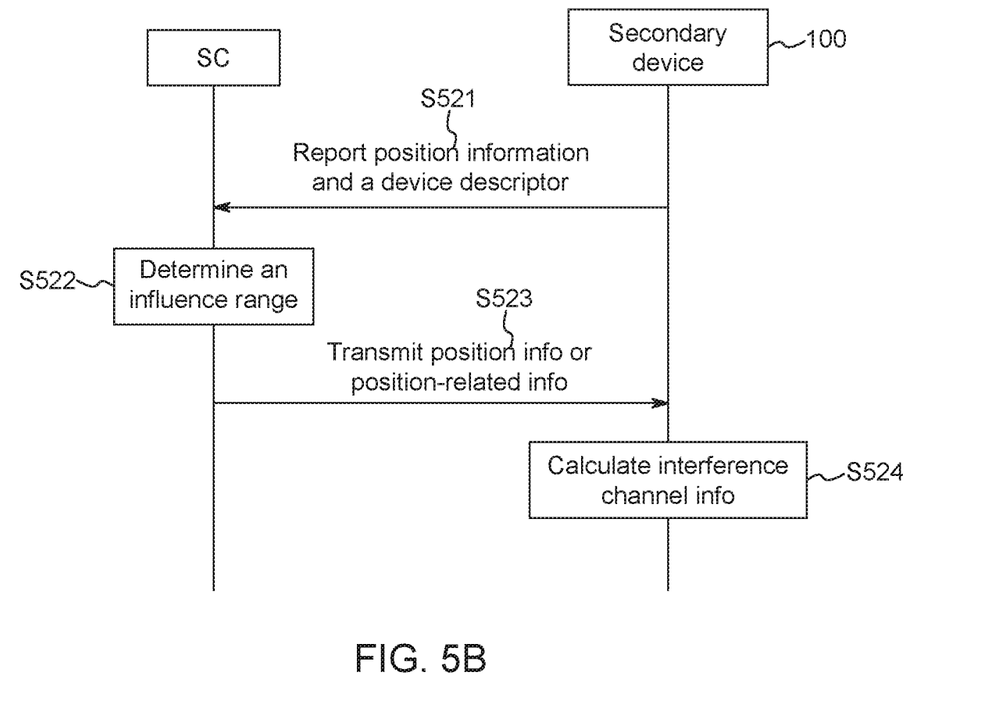
FIG. 5B is a schematic flowchart of a second example for determining interference channel information from a specific secondary device to other secondary device.
Figure 5C:
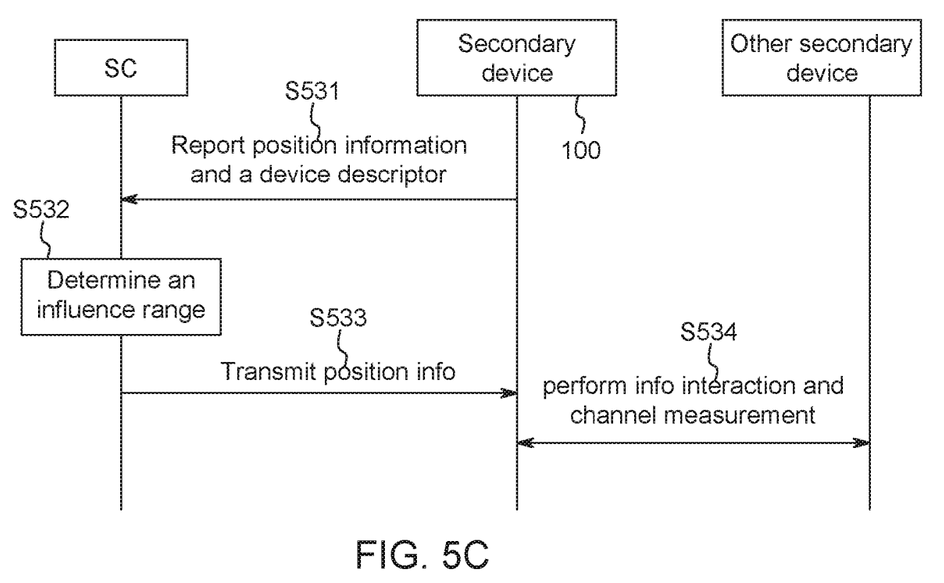
FIG. 5C is a schematic flowchart of a third example for determining interference channel information from a specific secondary device to other secondary device.

FIGS. 5A to 5C are flowcharts of three examples for determining interference channel information from a specific secondary device to other secondary device.

As shown in FIG. 5A, the secondary device 100 reports position information and a device descriptor thereof to the SC in step S511. The SC may obtain physical configuration for example a maximum transmission power of the secondary device 100 based on the device descriptor.

In step S512, the SC determines an influence range (that is, a range, a device in which suffers from interference from the secondary device 100) of the secondary device 100 based on, for example, the position, an operating frequency and a transmission power of the secondary device 100, detects positions and operating frequencies of one or more other secondary devices within the influence range, to determine other secondary device which suffer from interference from the secondary device 100, and the SC determines interference channel information from the secondary device 100 to other secondary device using an AGE database.

Then, the SC transmits the determined interference channel information from the secondary device 100 to other secondary device to the secondary device 100 in step S513.

FIG. 5B shows another example for determining interference channel information between the secondary devices. In the example, each of the secondary devices in the secondary system reports device capability information thereof to the spectrum coordinator SC regularly.

As shown in FIG. 5B, the secondary device 100 reports position information and a device descriptor thereof to the SC in step S521. As descried above, the device descriptor may include information on a maximum transmission power of the secondary device 100.

In step S522, the SC determines an influence range of the secondary device 100 based on, for example, the position, an operating frequency and a transmission power of the secondary device 100, and detects positions and operating frequencies of one or more other secondary devices within the influence range, to determine other secondary device which suffer from interference from the secondary device 100.

Then the SC transmits position information (or other parameter information for characterizing a relative position) and device capability information of the determined interfered other secondary device to the secondary device 100 in step S523.

The secondary device 100 calculates interference channel information from the secondary device 100 to the interfered secondary device based on the received position information and the received device capability information of the interfered secondary device in step S524.

FIG. 5C shows another example for determining interference channel information between the secondary devices.

As shown in FIG. 5C, the secondary device 100 reports position information and a device descriptor thereof to the SC in step S531.

Then, in step S532, the SC determines an influence range of the secondary device 100 based on, for example, the position, an operating frequency, a transmission power of the secondary device 100, and determines other secondary devices on the same frequency band as the secondary device 100 which suffer from interference within the influence range.

Then, the SC transmits position information of the determined interfered other secondary device to the secondary device 100 in step S533.

In step S534, the secondary device 100 performs information interaction and actual channel measurement with the interfered secondary device based on the received position information of the interfered secondary device, to obtain interference channel information from the secondary device 100 and the interfered secondary device. For example, in order to perform channel measurement, the secondary device 100 and the interfered secondary device need to exchange device capability information with each other. The device capability information may be exchanged under control of the SC, or may be exchanged by the secondary device 100 and the interfered secondary device via a wired or wireless link.

Figure 6:
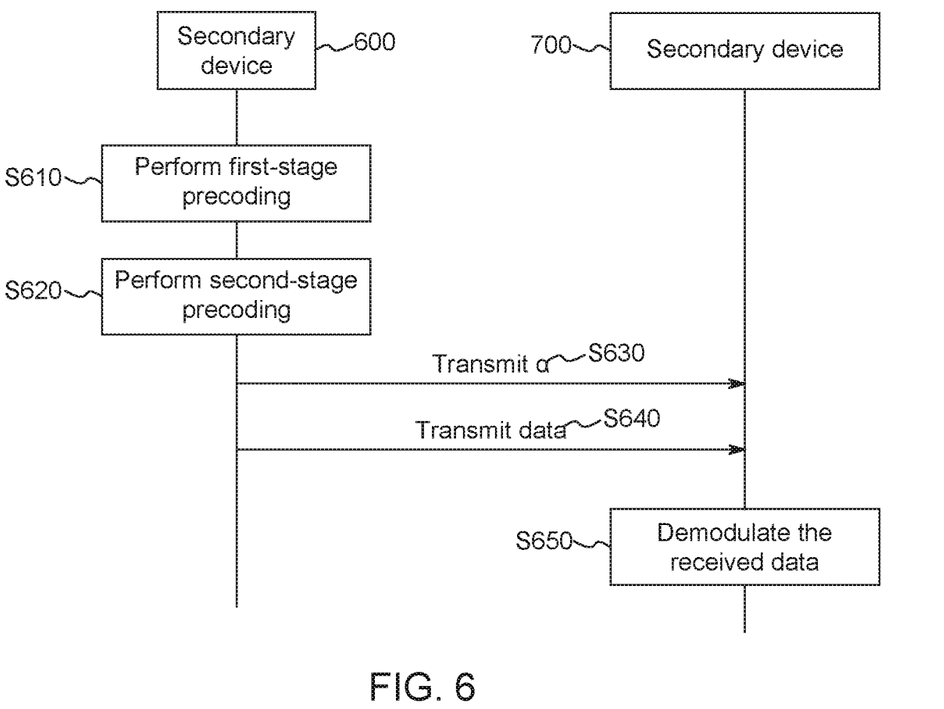
FIG. 6 is a schematic flowchart of communication between a secondary device as a transmitting terminal and a secondary device as a receiving terminal.

FIG. 6 is a flowchart showing communication between secondary devices, and the flow includes two-stage precoding at a transmitting terminal and demodulation processing at a receiving terminal.

As shown in FIG. 6, in step S610, a secondary device 600 as the transmitting terminal performs first-stage precoding, that is, SP precoding, to suppress interference from the secondary device 600 to a primary device on the same frequency band as the secondary device 600. In the first-stage precoding, the above-described interference channel information from the secondary device 600 to the interfered primary device is used.

Next, the secondary device 600 performs second-stage precoding in step S620, to suppress interference from the secondary device 600 to other secondary devices on the same frequency band as the secondary device 600. In the second-stage precoding, the above-described interference channel information from the secondary device 600 to other secondary device is used.

The second-stage precoding is an improvement in the present disclosure for a conventional signal to leakage and noise ratio (SLNR) algorithm. A focus for the improvement is to take a case that different secondary devices have different priorities into consideration, and an interference leakage weighting factor α related to the priority is introduced. The second-stage precoding according to the present disclosure can guarantee a higher QoS for a secondary device having a higher priority. The second-stage precoding will be described in detail hereinafter.

Then, the secondary device 600 as the transmitting terminal transmits an interference leakage weighting factor α, interference channel information from the secondary device 600 to the interfered primary device, and interference channel information from the secondary device 600 to other interfered secondary device used in precoding to a secondary device 700 as a receiving terminal in step S630. Optionally, for example, in examples shown in FIGS. 4A and 5A, the SC rather than the secondary device 600 as the transmitting terminal directly transmits the above information to the secondary device 700 at the receiving terminal.

Further, the secondary device 600 as the transmitting terminal transmits data to the secondary device 700 as the receiving terminal in step S640. It is noted that, although FIG. 6 illustrates the above information and the above data are transmitted in two steps, the present disclosure is not limited thereto. For example, the above information and the above data may be transmitted in the same step or in a different order.

In step S650, the secondary device 700 as the receiving terminal demodulates the received data based on the received interference channel information and the received interference leakage weighting factor and according to the minimum mean square error (MMSE) criterion.

FIG. 6 is a schematic flow of a general communication flow, and various modifications may also be made on the above flow according to actual conditions.

For example, in a case where no primary device operates in the primary system, SP precoding in step S610 may be omitted, hence, the secondary device 600 as the transmitting terminal only performs the second-stage precoding in step S620. Correspondingly, processing for acquiring the interference channel information between the secondary device and the interfered primary device as in FIGS. 4A to 4C may also be omitted.

For example, in a case where the present disclosure is applied to a DSA system in which the secondary devices have the same priority, and since it is no required to consider priorities of the secondary devices, the same interference leakage weighting factors α may be determined for the secondary devices in the second-stage precoding. For example, a value of α may be set to be 1. In this case, the second-stage precoding is the same as the conventional SLNR algorithm.

Figure 7:
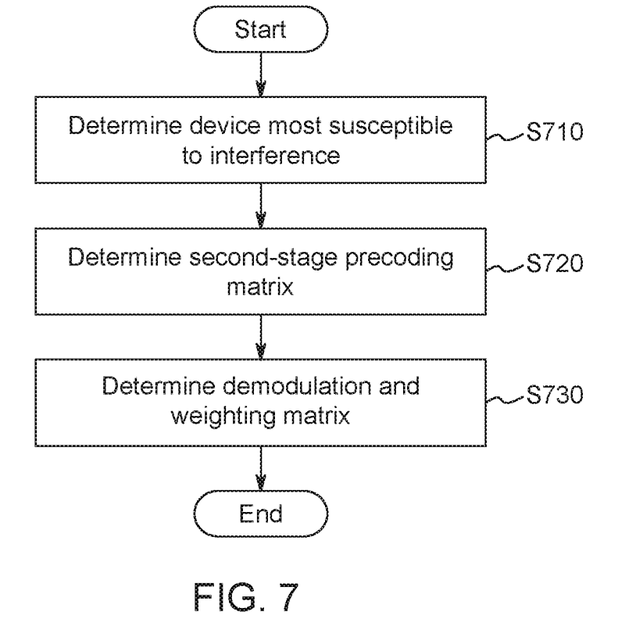
FIG. 7 is a flowchart showing two-stage transmission precoding and a demodulation algorithm of a secondary device.

FIG. 7 is a flowchart showing algorithms of precoding at a secondary device as the transmitting terminal and demodulation at a secondary device as the receiving terminal.

As shown in FIG. 7, in step S710, for an i-th secondary device as a transmitting terminal, a primary device which is most susceptible to interference from the i-th secondary device is determined, and interference channel information from the i-th secondary device to the interfered primary device is further determined. Then, a first-stage precoding matrix $F_i^{(1)}$ is obtained based on the determined interference channel information according to the following equation (1), to perform first-stage precoding.

$$F_i^{(1)} = V_0^{(0)} \quad (1)$$

where $V_0^{(0)}$ represents a zero space of a normalized interference channel matrix from the i-th secondary device to the interfered primary device.

In particular, the first-stage precoding matrix $F_i^{(1)}$ may be set as a unit matrix in a case where no primary device operates.

In step S720, for the i-th secondary device as the transmitting terminal, a second-stage precoding matrix $F_i^{(2)}$ is determined to perform second-stage precoding.

As described above, the second-stage precoding according to the present disclosure is an improvement for a conventional SLNR algorithm. PSLNR is proposed in the present disclosure, which is a signal to leakage and noise ratio based on a priority. PSLNR is defined as follows:

$$PSLNR_i = \frac{E\{|H_{ii}F_ix_i|^2\}}{E\left\{\left|\alpha_i \sum_{r=1,r\neq i}^{k} H_{ir}F_ix_i + n_{si}\right|^2\right\}} = \frac{H_{ii}F_i \cdot F_i^H H_{ii}^H}{\alpha_i^2 \sum_{r=1,r\neq i}^{k} H_{ir}F_iF_i^H H_{ir}^H + I_N} \quad (2)$$

where $H_{ii}$ represents a channel matrix from the i-th secondary device to a secondary device as the receiving terminal communicating with the i-th secondary device, $F_i$ represents a precoding matrix of the i-th secondary device, and $F_i = F_i^{(1)} F_i^{(2)}$, $x_i$ represents data transmitted by the i-th secondary device, $\alpha_i$ represents an interference leakage weighting factor for the i-th secondary device, $H_{ir}$ represents a channel matrix from the i-th secondary device to an r-th other secondary device, $n_{si}$ represents an additive noise for the i-th secondary device, and $I_N$ represents a power of a noise for the i-th secondary device.

A numerator part of the above equation (2) represents a power of a useful signal of the i-th secondary device, and a first term of a denominator part represents a sum of powers leaked from the i-th secondary device to other (k−1) secondary devices, that is, interference from the i-th secondary device to other secondary devices, and a second term of the denominator part represents a power of the noise.

In this case, a process of solving an optimization problem of the second-stage precoding matrix $F_i^{(2)}$ of the i-th secondary device may be represented as follows:

$$\begin{cases} \max_{F_i^{(2)}} PSLNR_i \\ \text{s.t. } \|F_i\|^2 \leq P_i \\ F_i = F_i^{(1)} F_i^{(2)} \end{cases} \quad (3)$$

where $P_i$ is a transmission power of the i-th secondary device. The above equation (3) shows that, the second-stage precoding matrix $F_i^{(2)}$ is obtained by solving a precoding matrix which can maximize a value of PSLNR. The second-stage precoding matrix $F_i^{(2)}$ obtained by solving may be represented as follows:

$$F_i^{(2)} = \Phi\left[\left(\alpha_i^2 \sum_{r=1, r\neq i}^{k} F_i^{(1)H} H_{ir}^H H_{ir} F_i^{(1)} + I_N\right)^{-1}, F_i^{(1)H} H_{ii}^H H_{ii} F_i^{(1)}\right] \quad (4)$$

where $\Phi[A,B]$ represents a characteristic factor corresponding to a maximum characteristic value of a matrix pencil composed of A and B.

As can be seen from the above equation (4) that, the interference leakage weighting factor $\alpha$ is introduced in calculation of the second-stage precoding matrix, and $\alpha$ is determined based on a priority of the secondary device. Hence, different priorities of the secondary device are taken into consideration in the second-stage precoding according to the present disclosure, in this way, a purpose of guaranteeing different QoS for secondary devices having different priorities can be achieved.

Next, in step S730, for an i-th secondary device as a receiving terminal, a demodulation and weighting matrix $w_{si}$ is determined using MMSE criterion, as shown in the following equation (5):

$$w_{si} = \left(\alpha_i^2 \sum_{r=1, r\neq i}^{k} H_{ir} F_i F_i^H H_{ir}^H + I_N\right)^{-1} H_{ii} F_i \quad (5)$$

Where $F_i = F_i^{(1)} F_i^{(2)}$.

Figure 8:
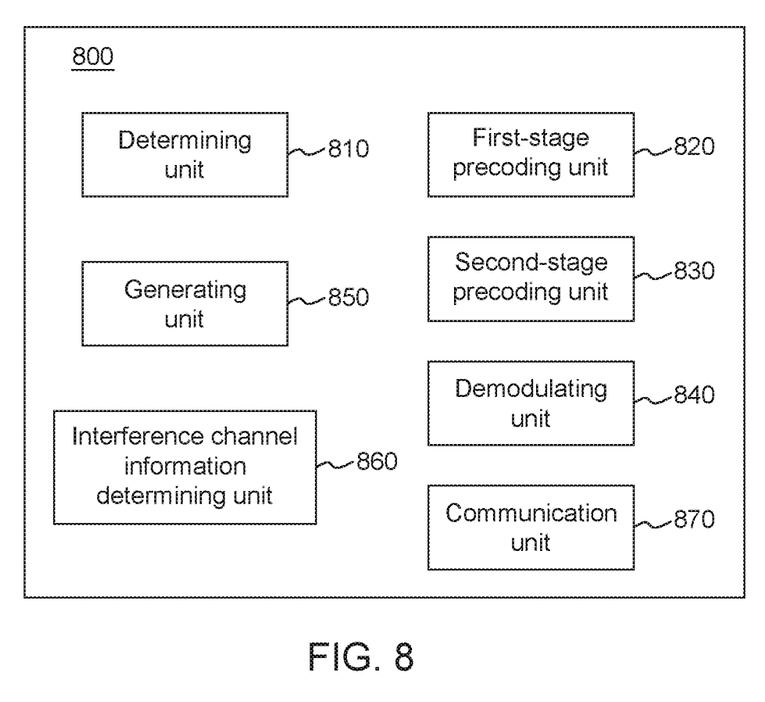
FIG. 8 is a structural block diagram of a secondary device according to the present disclosure.

FIG. 8 shows a structural block diagram of a secondary device according to the present disclosure. As shown in FIG. 8, the secondary device 800 includes a determining unit 810, a first precoding unit 820, a second procoding unit 830, a demodulating unit 840, a generating unit 850, an interference channel information determining unit 860 and a communication unit 870. It is noted that, the interference channel information determining unit 860 may be optional, for example, in embodiments shown in FIGS. 4A and 5A, the secondary device 800 may not include the interference channel information determining unit 860.

The determining unit 810 is configured to determine one or more of position information, a priority, payment information, device capability information of the secondary device 800, to report related information to a SC. The first precoding unit 820 is configured to perform first-stage SP precoding as described above using interference channel information from the secondary device 800 to the interfered primary device. The second precoding unit 830 is configured to perform second-stage precoding using interference channel information from the secondary device 800 to other interfered secondary device and an interference leakage weighting factor. The demodulating unit 840 is configured to perform demodulation using the interference channel information from the secondary device 800 to the interfered primary device and the interference channel information from the secondary device 800 to other interfered secondary device and the interference leakage weighting factor according to MME criterion. The generating unit 850 is configured to generate information indicating whether the secondary device 800 can perform first-stage SP precoding, to report to the SC. In the embodiments of FIGS. 4B to 4C and FIGS. 5B to 5C, the interference channel information determining unit 860 of the secondary device 800 may be configured to determine interference channel information from the secondary device 800 to the interfered primary device or interference channel information from the secondary device 800 to other interfered secondary device. Further, the communication unit 870 is configured to transmit/receive a signal between the secondary device 800 and the SC or between the secondary device 800 and other secondary device.

Figure 9:
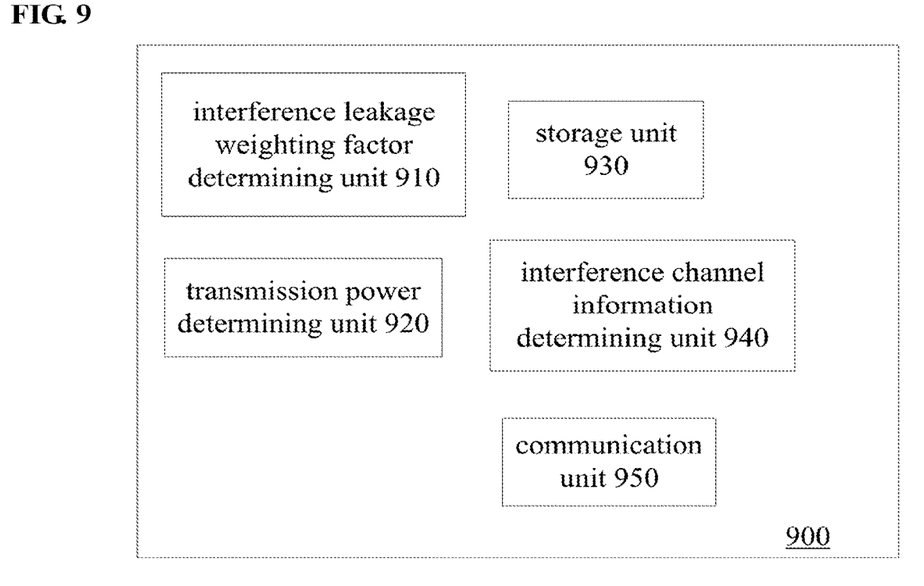
FIG. 9 is a structural block diagram of a spectrum coordinator according to the present disclosure.

FIG. 9 shows a block diagram of a spectrum coordinator (SC) according to the present disclosure. As show in FIG. 9, a SC 900 includes an interference leakage weighting factor determining unit 910, a transmission power determining unit 920, a storage unit 930, an interference channel information determining unit 940 and a communication unit 950. It should be noted that, the interference channel information determining unit 940 may be optional, for example, in the embodiments as shown in FIGS. 4B to 4C and FIGS. 5B to 5C, the SC 900 may not include the interference channel information determining unit 940.

The interference leakage weighting factor determining unit 910 is configured to determine an interference leakage weighting factor for a secondary device based on one or more of position information, an operating power, a transmission power, a priority and payment information of the secondary device. The transmission power determining unit 920 is configured to determine a transmission power for the secondary device based on whether the secondary device can perform SP precoding. The storage unit 930 is configured to store the position information, the operating frequency, the transmission power, the priority, the payment information, device capability information and the like of the secondary device, and may also store position information, an operating frequency, device capability information and the like of the primary device in a primary system. In the embodiments of FIGS. 4A and 5A, the interference channel information determining unit 940 may be configured to determine interference channel information from the secondary device to the interfered primary device or other interfered secondary device using an AGE database. The communication unit 950 is configured to transmit/receive a signal between the SC 900 and the secondary device or the primary device.

The primary system discussed herein may be, for example, an American Radar System (3550-3650 MHz) proposed by Federal Communications Commission (FCC) or a television broadcasting system. Additionally, the technology according to the present disclosure may be applied in for example a LTE-U system on 5 GHZ frequency band.

The specific embodiments of the present disclosure are described above in conjunction with the drawings, and the following technical effects can be achieved according to the technology of the present disclosure.

The transmitting terminal adopts two-stage precoding, thereby suppressing interference to the primary device on the same frequency band and interference to other secondary device on the same frequency band.

On the premise of guaranteeing QoS of the primary device, different levels of QoS can be guaranteed for secondary devices having different priorities. A secondary device having a higher priority can obtain higher QoS than a secondary device having a lower priority.

SP precoding is used to suppress interference from the secondary device to the primary device. As a result, compared with the conventional power control method, a limitation on the maximum transmission power of the secondary device using SP precoding is relaxed, and the transmission power may be increased by 26 dB at most.

The present disclosure can be applied to not only a DSA system in which the priorities of the secondary devices are different, but also a DSA system in which priorities of the secondary devices are the same. In a case where the present disclosure is applied to the DSA system in which the priorities of the secondary devices are the same, the interference leakage weighting factors for various secondary devices are set to be equal values.

Based on a case that multiple networks such as a macro cell, a small cell, a pico cell, a home base station, a D2D coexist in a current mobile cellular network, a layered/hierarchical cellular network becomes an application scenario of cognitive radio in the 5G mobile communication. Hence, the present disclosure in conjunction with a feature development trend has a wide application prospect.

It is noted that, the various devices or components described herein are only logical and do not strictly correspond to physical devices or components. For example, the functions of each of the components described herein may be implemented by multiple physical entities, or the functions of multiple components described herein may be implemented by a single physical entity.

The series of processing performed by each device or component in the above-described embodiment may be implemented by software, hardware, or a combination of software and hardware. The programs included in the software may be stored in advance in a storage medium provided inside or outside each device or component. As an example, during execution, the programs are written to a random access memory (RAM) and executed by a processor (such as a CPU).

Figure 10:
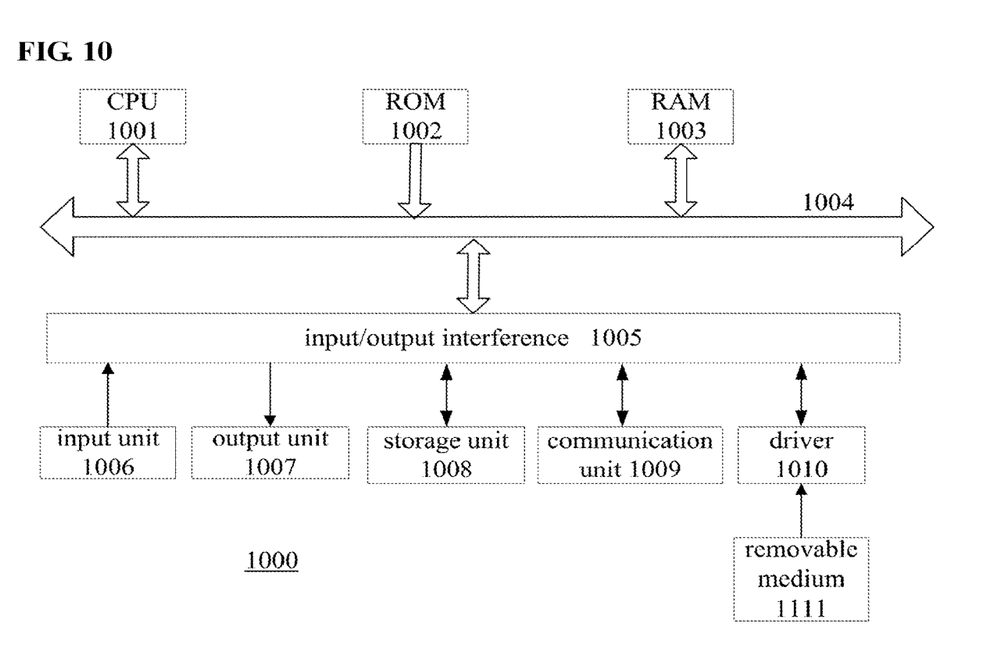
FIG. 10 is a block diagram showing an exemplary configuration of computer hardware.

FIG. 10 is a block diagram of an exemplary configuration of computer hardware for executing the above-described series of processing based on the programs.

In a computer 1000, a central processing unit (CPU) 1001, a read only memory (ROM) 1002 and a random access memory (RAM) 1003 are connected via a bus 1004.

An input/output interface 1005 is further connected to the bus 1004. The input/output interface 1005 is connected with the following components: an input unit 1006 in a form of a keyboard, a mouse, a microphone and the like; an output unit 1007 in a form of a display, a speaker and the like; a storage unit 1008 in a form of a hard disk, a non-volatile memory and the like; a communication unit 1009 in a form of a network interface card (such as a local area network (LAN) card, a modem and the like); and a driver 1010 for driving a removable medium 1011 such as a magnetic disk, an optical disk, a magneto-optical disk or a semiconductor memory.

In a computer having the above-described structure, the CPU 1001 loads the programs stored in the storage unit 1008 to the RAM 1003 via the input/output interface 1005 and the bus 1004, and executes the programs so as to perform the above-described series of processing.

The programs to be executed by the computer (the CPU 1001) may be recorded on the removable medium 1011 as a package medium in a form of, for example, a magnetic disk (including a floppy disk), an optical disk (including a compact disk-read only memory (CD-ROM)), a digital versatile disk (DVD) and the like), a mango-optical disk or a semiconductor memory. Alternatively, the programs to be executed by the computer (the CPU 1001) may also be provided by a wired or wireless transmission medium such as a local area network, Internet or digital satellite broadcasting.

The programs may be loaded in the storage unit 1008 via the input/output interface 1005 in a case that the removable medium 1011 is mounted in the driver 1010. In addition, the programs may be received by the communication unit 1009 via a wired or wireless transmission medium, and are installed in the storage unit 1008. Alternatively, the programs may be installed in advance in the ROM 1002 or the storage unit 1008.

The programs to be executed by the computer may execute the processing according to an order described in the specification, or may be execute the processing in parallel or execute the processing when necessary (such as when being called).

The embodiments and technical effects of the present disclosure have been described in detail in conjunction with the accompanying drawings as above, but the scope of the present disclosure is not limited thereto. Those skilled in the art should understand that, various modifications and variations can be made on the embodiments discussed herein without departing from the principle and spirit of the present disclosure, depending on design requirements and other factors. The scope of the present disclosure is defined by the appended claims or the equivalents thereof.

Furthermore, the present disclosure may also be configured as follows.

A spectrum management device includes one or more processors configured to: determine position information of each secondary device in a secondary system comprising a plurality of secondary devices; and determine a weighting factor for a specific secondary device based on the position information, where the weighting factor is used to adjust estimation of power leaked from the specific secondary device to other secondary devices.

The one or more processors are further configured to: determine a priority for each of the secondary devices; determine the number of the priorities of all active secondary devices on the same frequency band as the specific secondary device within a predetermined range of the specific secondary device, and preliminarily determine a value of the weighting factor based on the number of the priorities; and adjust the preliminarily determined value based on the number or a distribution density of the active secondary devices on the same frequency band as the specific secondary device which have the same priority as the specific secondary device, to determine the weighting factor.

The weighting factor is determined to be smaller in a case where the specific secondary device has a higher priority.

The one or more processors are further configured to preliminarily determine the value of the weighting factor evenly within a range from 0 to 1 based on the number of the priorities of all active secondary devices on the same frequency band as the specific secondary device.

The one or more processors are further configured to increase the preliminarily determined value in a case where the number or the distribution density of the active secondary devices on the same frequency band as the specific secondary device which have the same priority as the specific secondary device exceeds a predetermined threshold.

The one or more processors are further configured to determine payment information of the specific secondary device, and determine the weighting factor for the specific secondary device based on the payment information.

The one or more processors are further configured to: determine whether the specific secondary device is capable of performing first-stage precoding; and determine a transmission power for the specific secondary device based on a result of the determination, where a higher transmission power is determined for the specific secondary device in a case where the specific secondary device is capable of performing the first-stage precoding.

The one or more processors are further configured to: determine, using a channel information database, a first interference channel information from the specific secondary device to a specific primary device in a primary system and a second interference channel information from the specific secondary device to other secondary devices, based on the position information and the transmission power of the specific secondary device.

The one or more processors are further configured to: determine position-related information and/or device capability information of a specific primary device in a primary system, and position-related information and/or device capability information of other secondary devices, based on the position information and the transmission power of the specific secondary device.

A secondary device in a secondary system includes one or more processors configured to determine position information of the secondary device, so that a spectrum management device determines a weighting factor for the secondary device based on the position information.

The one or more processors are further configured to perform second-stage precoding in which the weighting factor determined by the spectrum management device is used to adjust estimation of power leaked from the secondary device to other secondary devices.

The one or more processors are further configured to determine a priority for the secondary device, so that the spectrum management device determines the weighting factor based on the priority, and the weighting factor is determined to be smaller in a case where the secondary device has a higher priority.

The weighting factor is determined by the spectrum management device based on the number of the priorities of all active secondary devices on the same frequency band as the secondary device within a predetermined range of the secondary device, and the number or a distribution density of the secondary devices having each of the priorities.

The one or more processors are further configured to: perform first-stage precoding before performing the second-stage precoding.

The one or more processors are further configured to generate information indicating whether the secondary device is capable of performing the first-stage precoding, so that the spectrum management device determines a transmission power for the secondary device based on the information, and the spectrum management device determines a higher transmission power for the secondary device in a case where the information indicates that the secondary device is capable of performing the first-stage precoding.

The one or more processors are further configured to: perform the first-stage precoding using a first interference channel information from the secondary device to a specific primary device in a primary system; and perform the second-stage precoding using a second interference channel information from the secondary device to other secondary devices in the secondary system.

The first interference channel information and the second interference channel information are determined by the spectrum management device using a channel information database based on the position information and the transmission power of the secondary device.

The one or more processors are further configured to: determine the first interference channel information based on position-related information and/or device capability information of the specific primary device determined by the spectrum management device; and determine the second interference channel information based on position-related information and/or device capability information of the other secondary devices determined by the spectrum management device.

The one or more processors are further configured to: determine device capability information of the specific primary device using position-related information of the specific primary device determined by the spectrum management device, to perform channel measurement, so as to determine the first interference channel information; and determine device capability information of the other secondary devices using position-related information of the other secondary devices determined by the spectrum management device, to perform channel measurement, so as to determine the second interference channel information.

The device capability information includes an antenna array type, an antenna boresight azimuth angle, and an antenna boresight elevation angle.

The position-related information of the specific primary device is position information of a reference point, and the reference point is a position within a coverage area of the primary system which is closest to the secondary device.

The one or more processors are further configured to demodulate a received signal using the weighting factor, the first interference channel information and the second interference channel information.

A method for suppressing interference in a communication system, wherein the communication system includes a spectrum management device, a primary system including multiple primary devices, and a secondary system including multiple secondary devices. The method includes: transmitting position information of each of the secondary devices to the spectrum management device; determining, by the spectrum management device, a weighting factor for a specific secondary device based on the received position information; and performing second-stage precoding, in which the weighting factor is used to adjust estimation of power leaked from the specific secondary device to other secondary devices.

The weighting factor has a value ranging from 0 to 1.

The method further includes: transmitting a priority of each of the secondary devices to the spectrum management device; and determining, by the spectrum management device, the weighting factor for the specific secondary device based on the received priorities, wherein the weighting factor is determined to be smaller in a case where the specific secondary device has a higher priority.

The method further includes: determining the number of the priorities of all active secondary devices on the same frequency band as the specific secondary device within a predetermined range of the specific secondary device, and preliminarily determining a value of the weighting factor based on the number of the priorities; and adjusting the preliminarily determined value based on the number or a distribution density of the active secondary devices on the same frequency band as the specific secondary device which have the same priority as the specific secondary device, to determine the weighting factor.

The method further includes: performing first-stage precoding before performing the second-stage precoding.

The method further includes: transmitting information indicating whether the specific secondary device is capable of performing the first-stage precoding to the spectrum management device; and determining, by the spectrum management device, a transmission power for the specific secondary device based on the information, where a higher transmission power is determined for the specific secondary device in a case where the information indicates that the specific secondary device is capable of performing the first-stage precoding.

The method further includes: determining, by the spectrum management device using a channel information database, a first interference channel information from the specific secondary device to a specific primary device in the primary system and a second interference channel information from the specific secondary device to other secondary devices based on the position information and the transmission power of the specific secondary device; and transmitting, by the spectrum management device, the first interference channel information and the second interference channel information to the specific secondary device.

The method further includes: determining, by the spectrum management device, position-related information and/or device capability information of a specific primary device in the primary system, and position information and/or device capability information of other secondary devices, based on the position information and the transmission power of the specific secondary device, and transmitting the determined information to the specific secondary device; determining, by the specific secondary device, a first interference channel information from the specific secondary device to the specific primary device based on the position information and/or the device capability information of the specific primary device, and determining, by the specific secondary device, a second interference channel information from the specific secondary device to the other secondary devices based on the position information and/or the device capability information of the other secondary devices.

The method further includes: determining, by the spectrum management device, position-related information of a specific primary device in the primary system and position-related information of other secondary devices based on the position information and the transmission power of the specific secondary device, and transmitting the determined information to the specific secondary device; and determining, by the specific secondary device, device capability information of the specific primary device based on the position-related information of the specific primary device, to perform channel measurement, so as to determine the first interference channel information; and determining, by the specific secondary device, device capability information of the other secondary devices based on the position-related information of the other secondary devices, to perform channel measurement, so as to determine the second interference channel information.

The method further includes demodulating, by the specific secondary device, a received signal using the weighting factor, the first interference channel information and the second interference channel information.

The invention claimed is:

1. A spectrum management device, comprising one or more processors configured to:
　get position information of each secondary device in a secondary system including a plurality of secondary devices; and
　determine a weighting factor for a specific secondary device based on the position information,
　wherein the weighting factor is used to describe estimation of power leaked from the specific secondary device to other secondary devices,
　wherein the one or more processors are further configured to:
　　determine whether the specific secondary device is capable of performing first-stage precoding, and
　　determine a transmission power for the specific secondary device based on a result of the determination, and
　wherein a higher transmission power is determined for the specific secondary device in a case where the specific secondary device is capable of performing the first-stage precoding than in a case where the specific secondary device is not capable of performing the first-stage precoding.

2. The spectrum management device according to claim 1, wherein the one or more processors are further configured to:
　determine a priority for each of the secondary devices;
　determine the number of the priorities of all active secondary devices on the same frequency band as the specific secondary device within a predetermined range of the specific secondary device, and preliminarily determine a value of the weighting factor based on the number of the priorities; and
　adjust the preliminarily determined value based on the number or a distribution density of the active secondary devices on the same frequency band as the specific secondary device which have the same priority as the specific secondary device, to determine the weighting factor.

3. The spectrum management device according to claim 2, wherein the one or more processors are further configured to increase the preliminarily determined value in a case where the number or the distribution density of the active secondary devices on the same frequency band as the specific secondary device which have the same priority as the specific secondary device exceeds a predetermined threshold.

4. The spectrum management device according to claim 1, wherein the one or more processors are further configured to determine, using a channel information database, a first interference channel information from the specific secondary device to a specific primary device in a primary system and a second interference channel information from the specific secondary device to other secondary devices, based on the position information and the determined transmission power of the specific secondary device.

5. The spectrum management device according to claim 1, wherein the one or more processors are further configured to determine position-related information and/or device capability information of a specific primary device in a primary system, and position-related information and/or device capability information of other secondary devices, based on the position information and the determined transmission power of the specific secondary device.

6. A secondary device in a secondary system, comprising one or more processors configured to:
　determine position information of the secondary device so that a spectrum management device determines a weighting factor for the secondary device based on the position information,
　wherein it is determined whether the secondary device is capable of performing first-stage precoding, a transmission power for the secondary device is determined based on a result of the determination, and a higher transmission power is determined for the secondary device in a case where the secondary device is capable of performing the first-stage precoding than in a case where the specific secondary device is not capable of performing the first-stage precoding, the one or more processors further configured to obtain the determined transmission power;

wherein the one or more processors are further configured to perform second-stage precoding in which the weighting factor determined by the spectrum management device is used to adjust estimation of power leaked from the secondary device to other secondary devices; and wherein the one or more processors are further configured to perform the first-stage precoding before performing the second-stage precoding in the case where the secondary device is capable of performing the first-stage precoding.

7. The secondary device according to claim 6, wherein the one or more processors are further configured to:
perform the first-stage precoding using a first interference channel information from the secondary device to a specific primary device in a primary system; and
perform the second-stage precoding using a second interference channel information from the secondary device to other secondary devices in the secondary system.

8. The secondary device according to claim 7, wherein the one or more processors are further configured to:
determine the first interference channel information based on position-related information and/or device capability information of the specific primary device determined by the spectrum management device; and
determine the second interference channel information based on position-related information and/or device capability information of the other secondary devices determined by the spectrum management device.

9. The secondary device according to claim 7, wherein the one or more processors are further configured to:
determine device capability information of the specific primary device using position-related information of the specific primary device determined by the spectrum management device, to perform channel measurement, so as to determine the first interference channel information; and
determine device capability information of the other secondary devices using position-related information of the other secondary devices determined by the spectrum management device, to perform channel measurement, so as to determine the second interference channel information.

10. The secondary device according to claim 8, wherein the device capability information comprises an antenna array type, an antenna boresight azimuth angle and an antenna boresight elevation angle.

11. The secondary device according to claim 8, wherein the position-related information of the specific primary device is position information of a reference point, and the reference point is a position within a coverage area of the primary system which is closest to the secondary device.

12. The secondary device according to claim 7, wherein the one or more processors are further configured to demodulate a received signal using the weighting factor, the first interference channel information and the second interference channel information.

13. A method for suppressing interference in a communication system, the method comprising:
transmitting position information of each of secondary devices to a spectrum management device;
determining, by the spectrum management device, a weighting factor for a specific secondary device based on the received position information;
performing second-stage precoding in which the weighting factor is used to adjust estimation of power leaked from the specific secondary device to other secondary devices;
determining whether the specific secondary device is capable of performing first-stage precoding; and
determining a transmission power for the specific secondary device based on a result of the determination,
wherein a higher transmission power is determined for the specific secondary device in a case where the specific secondary device is capable of performing the first-stage precoding than in a case where the specific secondary device is not capable of performing the first-stage precoding.

14. The method according to claim 13, further comprising:
transmitting a priority of each of the secondary devices to the spectrum management device; and
determining, by the spectrum management device, the weighting factor for the specific secondary device based on the received priorities.

15. The method according to claim 14, further comprising:
determining the number of the priorities of all active secondary devices on the same frequency band as the specific secondary device within a predetermined range of the specific secondary device, and preliminarily determining a value of the weighting factor based on the number of the priorities; and
adjusting the preliminarily determined value based on the number or a distribution density of the active secondary devices on the same frequency band as the specific secondary device which have the same priority as the specific secondary device, to determine the weighting factor.

16. The method according to claim 13, further comprising:
in the case where the secondary device is capable of performing the first stage precoding, performing first-stage precoding before performing the second-stage precoding.

17. The method according to claim 16, further comprising:
determining, by the spectrum management device using a channel information database, a first interference channel information from the specific secondary device to a specific primary device in a primary system and a second interference channel information from the specific secondary device to other secondary devices based on the position information and the determined transmission power of the specific secondary device, and
transmitting, by the spectrum management device, the first interference channel information and the second interference channel information to the specific secondary device.

* * * * *